US012586367B2

(12) United States Patent
Iaconis et al.

(10) Patent No.: US 12,586,367 B2
(45) Date of Patent: Mar. 24, 2026

(54) QUANTUM CONVOLUTIONAL NEURAL NETWORK CIRCUIT

(71) Applicants: IonQ, Inc., College Park, MD (US); Hyundai Motor Company, Seoul (KR); Kia Corporation, Seoul (KR)

(72) Inventors: Jason John Iaconis, Boulder, CO (US); Sang Hyub Kim, La Canada Flintridge, CA (US); Soon Cheol Park, Suwon-si (KR); Hanlae Jo, Seoul (KR); Sangtae Kim, Yongin-si (KR)

(73) Assignees: IonQ, Inc., College Park, MD (US); Hyundai Motor Company, Seoul (KR); Kia Corporation, Seoul (KR)

( * ) Notice: Subject to any disclaimer, the term of this patent is extended or adjusted under 35 U.S.C. 154(b) by 301 days.

(21) Appl. No.: 18/528,155

(22) Filed: Dec. 4, 2023

(65) Prior Publication Data

US 2024/0428575 A1      Dec. 26, 2024

Related U.S. Application Data

(60) Provisional application No. 63/386,104, filed on Dec. 5, 2022.

(51) Int. Cl.
*G06V 10/82*         (2022.01)
*G06V 10/77*         (2022.01)

(52) U.S. Cl.
CPC .......... *G06V 10/82* (2022.01); *G06V 10/7715* (2022.01)

(58) Field of Classification Search
None
See application file for complete search history.

(56) References Cited

U.S. PATENT DOCUMENTS

| | | | | |
|---|---|---|---|---|
| 2019/0164034 A1* | 5/2019 | Gambetta | ................ | G06N 3/08 |
| 2020/0005154 A1* | 1/2020 | Herbster | ................ | G06N 20/20 |
| 2020/0342345 A1* | 10/2020 | Farhi | ....................... | G06N 3/063 |
| 2025/0103932 A1* | 3/2025 | Prati | ....................... | G06N 10/20 |

FOREIGN PATENT DOCUMENTS

WO       2022/251526 A2    12/2022

OTHER PUBLICATIONS

Hur et al., "Quantum convolutional neural network for classical data classification", Quantum Mach. Intell., vol. 4, No. 3, Feb. 11, 2022, 18 pages.

(Continued)

*Primary Examiner* — Leon Flores
(74) *Attorney, Agent, or Firm* — ARENTFOX SCHIFF LLP

(57)               ABSTRACT

Aspects of the present disclosure relate generally to systems and methods for classifying an object in an image using a quantum convolutional neural network (QCNN). A method includes receiving the image; compressing, using an autoencoder, the image by extracting a plurality of features; encoding the plurality of features into quantum states by applying a quantum feature map corresponding to a quantum circuit unique to the image, where parameters of the quantum circuit depend on pixel values in the image; inputting the encoded plurality of features into the QCNN that is trained to detect the object and generate a classification of the object; and outputting the classification of the object generated by the QCNN.

16 Claims, 10 Drawing Sheets

400

(56) References Cited

OTHER PUBLICATIONS

Dilip et al., "Data compression for quantum machine learning", Physical Review Research, vol. 4, Oct. 2022, 8 pages.

Broughton et al., "TensorFlow Quantum: A Software Framework for Quantum Machine Learning", Aug. 26, 2021, 56 pages.

Alam et al., "Quantum-Classical Hybrid Machine Learning for Image Classification (ICCAD Special Session Paper)", 2021 IEEE/ACM International Conference on Computer Aided Design (ICCAD), IEEE, Nov. 1, 2021, 7 pages.

International Search Report issued in International Application No. PCT/US2023/082452 mailed Apr. 11, 2024, 4 pages.

* cited by examiner

600

Unary Encoding

2 qubit entangling gate
with angles calculated
classically

Each pixel is loaded into a local
quantum state.  Can be prepared
with a log(N) depth circuit.
Potential to generalize to more
dense encodings.

$x^{th}$ bit

<u>602</u>

Product State Encoding

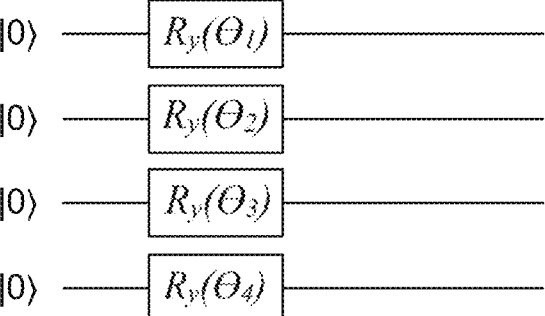

The pixel weight is encoded in the
angle of the qubit

$$|\Phi(x)\rangle = \begin{bmatrix} \cos\left(\frac{\pi}{2}x_1\right) \\ \sin\left(\frac{\pi}{2}x_1\right) \end{bmatrix} \otimes \begin{bmatrix} \cos\left(\frac{\pi}{2}x_2\right) \\ \sin\left(\frac{\pi}{2}x_2\right) \end{bmatrix} \otimes \cdots \otimes \begin{bmatrix} \cos\left(\frac{\pi}{2}x_N\right) \\ \sin\left(\frac{\pi}{2}x_N\right) \end{bmatrix}$$

QUANTUM CONVOLUTIONAL NEURAL NETWORK CIRCUIT

CROSS-REFERENCE TO RELATED APPLICATIONS

This application claims the benefit of U.S. Provisional Application No. 63/386,104, filed Dec. 5, 2022, which is herein incorporated by reference.

TECHNICAL FIELD

Aspects of the present disclosure relate generally to systems and methods for use in the implementation, operation, and/or use of quantum information processing (QIP) systems.

BACKGROUND

Image classification is useful in many fields. For example, image classification has been used for navigation and road analysis in vehicles, for facial recognition and object detection in security applications, and for disorder identification in the medical field. These are just a few examples from a plethora of use cases. Regardless of the field that image classification is used in, however, attributes such as accuracy and speed often need improvement—especially when the data that the image classification is being applied on is large, complex, and in abundance. Proper implementation of quantum computing can achieve such improvement.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of systems and methods for use in the implementation and/or operation of quantum information processing (QIP) systems, and more particularly, to implementation of quantum convolutional neural network (QCNN) circuit.

In some aspects, the techniques described herein relate to a method for classifying an object in an image using a quantum convolutional neural network (QCNN), including: receiving the image depicting the object; compressing, using an autoencoder, the image by extracting a plurality of features; encoding the plurality of features into quantum states using a quantum feature map that corresponds to a quantum encoding circuit unique to the image, wherein parameters of the quantum encoding circuit depend on pixel values in the image; inputting the encoded plurality of features into the QCNN that is executed on a parameterized quantum circuit (PQC) and trained to detect the object and generate a classification of the object from a plurality of classes, wherein the QCNN includes a plurality of layers including one or more convolutional layers that apply a unitary operator to neighboring qubits in the one or more convolutional layers; and outputting the classification of the object generated by the QCNN.

In some aspects, the techniques described herein relate to a method, wherein outputting the classification of the object generated by the QCNN includes: receiving one or more measurements from the QCNN; and inputting the one or more measurements into a fully connected neural network that is configured to output the classification from a plurality of classes.

In some aspects, the techniques described herein relate to a method, wherein the quantum encoding circuit includes one qubit per feature of the plurality of features.

In some aspects, the techniques described herein relate to a method, wherein the unitary operator is a quasi-local unitary operator applied in a translationally invariant way for a finite depth.

In some aspects, the techniques described herein relate to a method, wherein the unitary operator is a two qubit unitary operator that applies an arbitrary unitary operation using CNOT gates and single qubit rotations.

In some aspects, the techniques described herein relate to a method, wherein the quantum encoding circuit is composed of tensor objects, and wherein a controller translates the tensor objects into native hardware gates.

In some aspects, the techniques described herein relate to a method, wherein encoding the plurality of features includes applying one of: product state encoding or unary encoding.

In some aspects, the techniques described herein relate to a method, wherein the autoencoder is one of: an autoencoder executing principal component analysis, a fully connected autoencoder, or a locality preserving variational autoencoder.

In some aspects, the techniques described herein relate to a method, wherein the autoencoder is the autoencoder executing principal component analysis when an amount of qubits in the PQC is less than a threshold amount of qubits.

In some aspects, the techniques described herein relate to a method, wherein the autoencoder is the fully connected autoencoder or the locality preserving variational autoencoder when the amount of qubits in the PQC is not less than the threshold amount of qubits.

In some aspects, the techniques described herein relate to a method, wherein the autoencoder is the locality preserving variational autoencoder when a latent space dimension is less than a threshold size.

In some aspects, the techniques described herein relate to a method, wherein the autoencoder is the fully connected autoencoder when the latent space dimension is not less than the threshold size.

In some aspects, the techniques described herein relate to a method, wherein the autoencoder is the locality preserving variational autoencoder, wherein each pixel in a latent space includes compressed information only about a local region of the image, and wherein an overall dimension of the latent space is determined by a size of a local fully connected filter.

In some aspects, the techniques described herein relate to a method, wherein training the QCNN includes optimizing variational parameters of the QCNN using a cost function including one of: mean-squared error or binary cross entropy.

In some aspects, the techniques described herein relate to a method, further including prior to compressing the image: converting the image to a grayscale image; and equalizing pixel intensities in the converted image.

In some aspects, the techniques described herein relate to a quantum information processing (QIP) system for classifying an object in an image using a quantum convolutional neural network (QCNN), including: at least one memory; and at least one hardware processor coupled with the at least one memory and configured, individually or in combination, to: receive the image depicting the object; compress, using an autoencoder, the image by extracting a plurality of features; encode the plurality of features into quantum states using a quantum feature map that corresponds to a quantum encoding circuit unique to the image, wherein parameters of the quantum encoding circuit depend on pixel values in the image; input the encoded plurality of features into the QCNN that is executed on a parameterized quantum circuit (PQC) and trained to detect the object and generate a classification of the object from a plurality of classes, wherein the QCNN includes a plurality of layers including one or more convolutional layers that apply a unitary operator to neighboring qubits in the one or more convolutional layers; and output the classification of the object generated by the QCNN.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 6B depicts an example of product state encoding, in accordance with aspects of this disclosure.

DETAILED DESCRIPTION

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well-known components.

Solutions to the issues described above are explained in more detail in connection with FIGS. 1-8, with FIGS. 1-3 providing a background of QIP systems or quantum computers, and more specifically, of atomic-based QIP systems or quantum computers.

Figure 1:
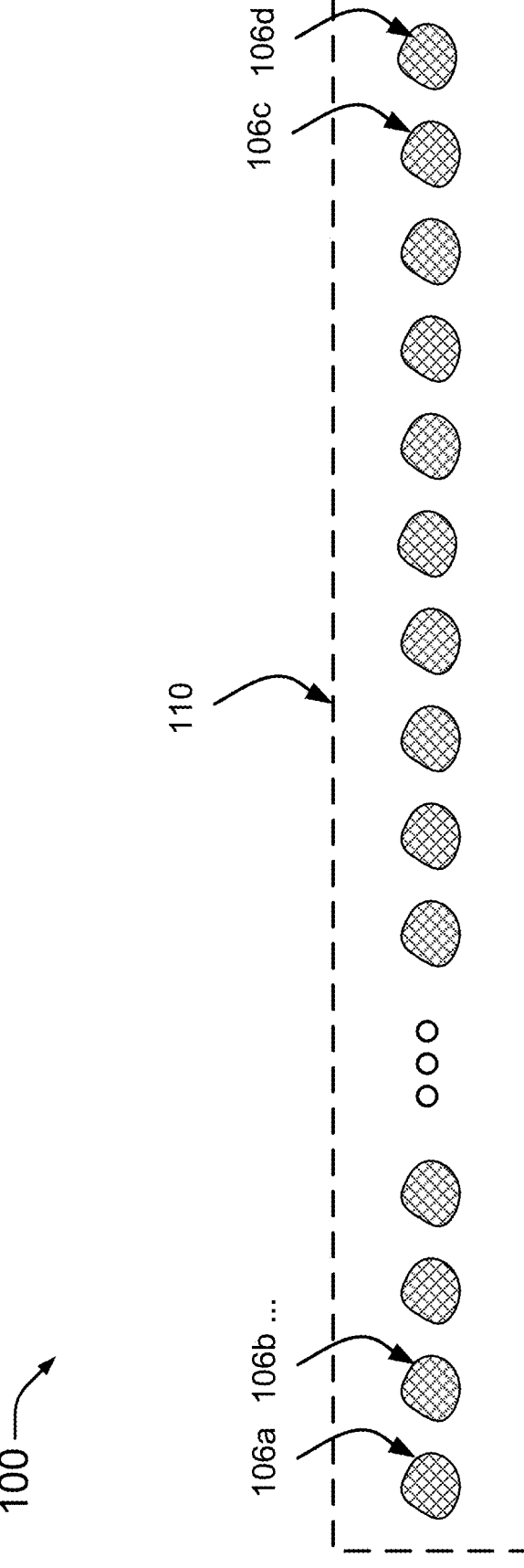
FIG. 1 illustrates a view of atomic ions a linear crystal or chain in accordance with aspects of this disclosure.
Figure 2:
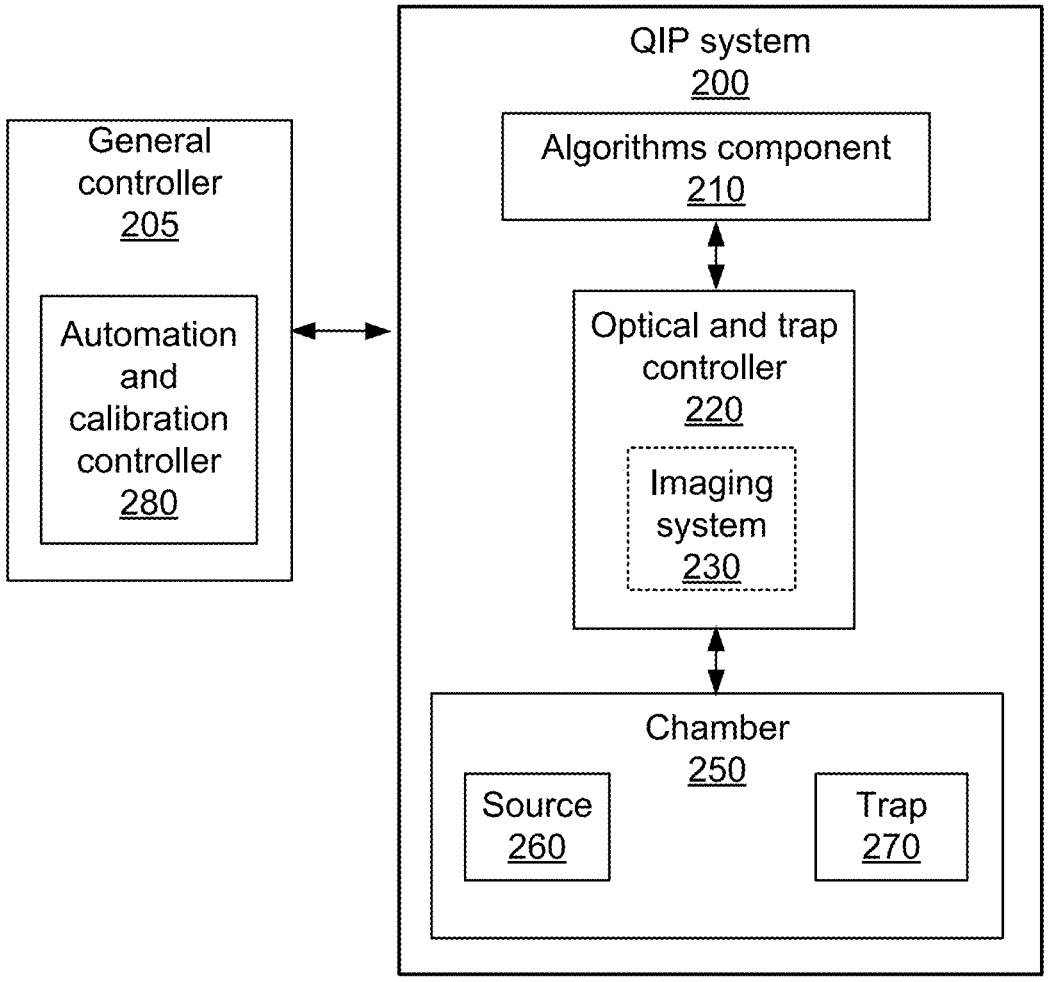
FIG. 2 illustrates an example of a quantum information processing (QIP) system, in accordance with aspects of this disclosure.

FIG. 1 illustrates a diagram 100 with multiple atomic ions or ions 106 (e.g., ions 106*a*, 106*b*, . . . , 106*c*, and 106*d*) trapped in a linear crystal or chain 110 using a trap (not shown; the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The ions 106 may be provided to the trap as atomic species for ionization and confinement into the chain 110. Some or all of the ions 106 may be configured to operate as qubits in a QIP system.

In the example shown in FIG. 1, the trap includes electrodes for trapping or confining multiple ions into the chain 110 laser-cooled to be nearly at rest. The number of ions trapped can be configurable and more or fewer ions may be trapped. The ions can be Ytterbium ions (e.g., $^{171}Yb^+$ ions), for example. The ions are illuminated with laser (optical) radiation tuned to a resonance in $^{171}Yb^+$ and the fluorescence of the ions is imaged onto a camera or some other type of detection device (e.g., photomultiplier tube or PMT). In this example, ions may be separated by a few microns (μm) from each other, although the separation may vary based on architectural configuration. The separation of the ions is determined by a balance between the external confinement force and Coulomb repulsion and does not need to be uniform. Moreover, in addition to Ytterbium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facility such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals to control the trap 270. The optical and trap controller 220 may also control the operation of lasers, optical systems, and optical components that are used to provide the optical beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially using the QIP system 200 with the optical elements of a beam shaping structure as arranged therein.

Figure 3:
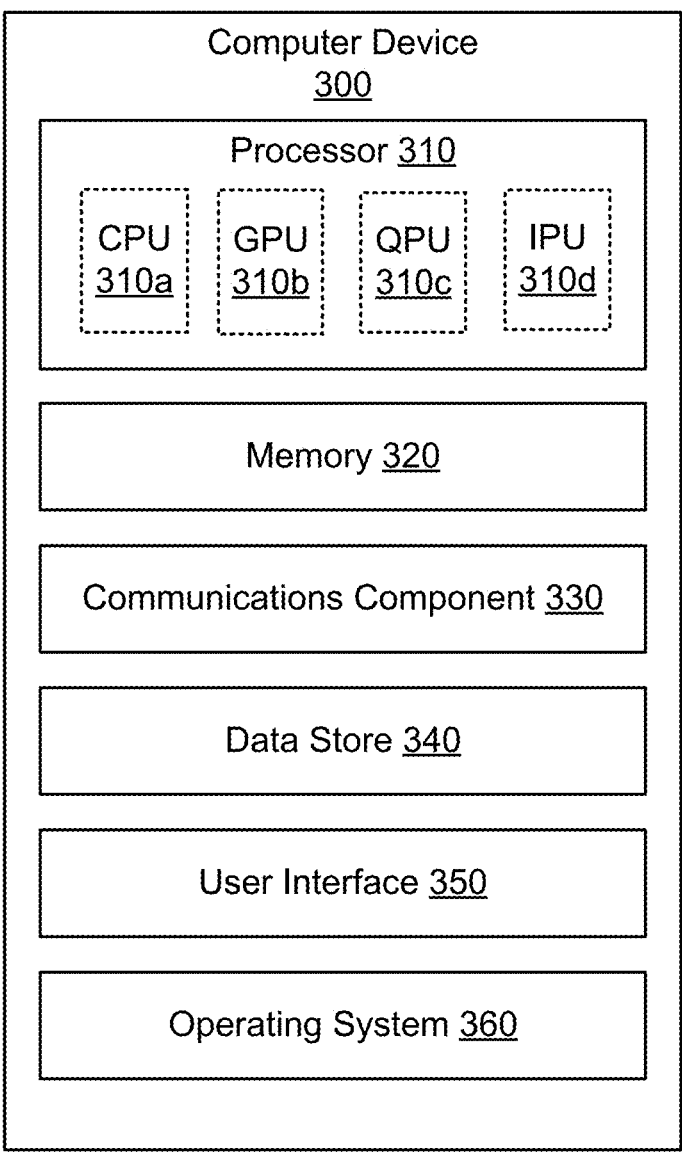
FIG. 3 illustrates an example of a computer device, in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310a, one or more graphics processing units (GPUs) 310b, one or more quantum processing units (QPUs) 310c, one or more intelligence processing units (IPUs) 310d (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310c. Some or all of the QPUs 310c may use atomic-based qubits, however, it is possible that different QPUs are based on different qubit technologies.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

For purposes of this disclosure, "classical computing," "classical program," "digital computing," "digital program," or variations thereof may refer to computing/processing of data that has been converted into binary numbers. Classical computing processors may include, but not be limited to, a central processing unit (CPU), a graphical processing unit (GPU), a tensor processing unit (TPU), application-specific integrated circuits (ASICs), field programmable gate arrays, etc., and unbound permutations thereof. Non-limiting examples thereof may include a classical optimization function that may be parallelized and run on a multicore classical computer; a classical computer with a GPU for performing parallel calculations, etc.

Moreover, "quantum computing," or variations thereof, may refer to computing/processing of data that has been encoded into qubits. Quantum computing utilizes qubits to perform computations to produce results that can be dramatically faster than classical computing or make classically computationally intractable problems tractable. The embodiments described herein certainly contemplate implementation in even faster and more efficient quantum computing systems as technologies evolve.

"Environment" may refer to a computing environment in which are found components that, when executing a program, may utilize, e.g., utilities such as libraries, other programs, other hardware, etc. Thus, reference may be made herein to a classical computing environment, a quantum computing environment, etc.

A "quantum gate" may refer to a controlled interaction that manipulates the state and/or phase of qubits in a quantum computing system, thus changing the system's information content.

A "quantum circuit" may refer to a sequence of quantum gate operations that act on a set of qubits. The name historically comes from quantum algorithms being expressed as a series of quantum logic gates, analogous to classical logic gates in traditional circuit design.

Quantum information processing (QIP) algorithms may be represented using quantum circuits. Abstract gate operations have been utilized for the design and construction of QIP algorithms which, when implemented at a physical level, must be compiled into a set of hardware-specific operations that manipulate qubit states. Within this context, a logical gate may refer to an abstract, design-oriented operation, whereas a physical gate may refer to a hardware-specific implementation.

In connection with the systems described in FIGS. 1-3, in one or more implementations, the QIP systems as disclosed herein are used to classify images.

Figure 4:
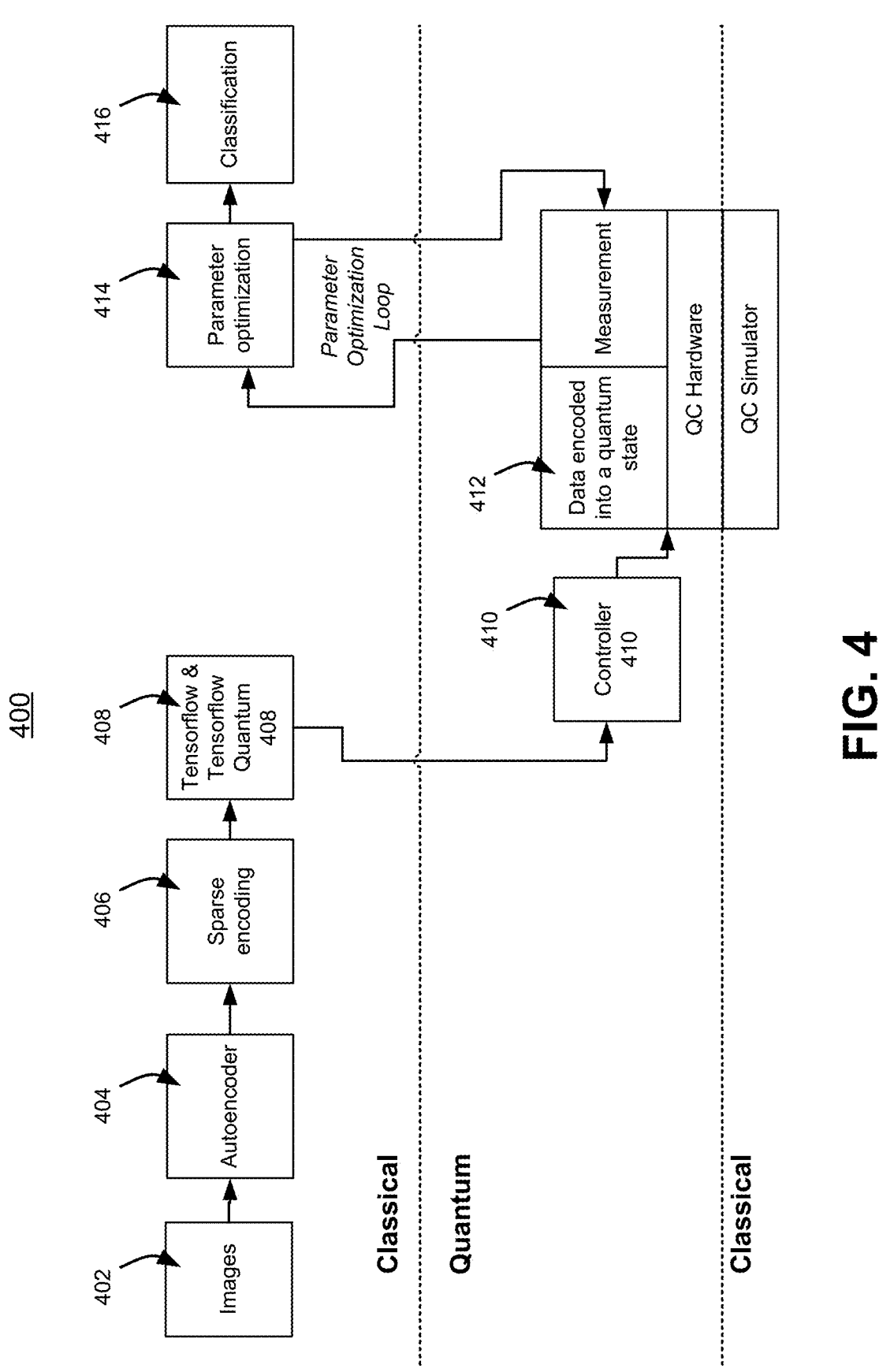
FIG. 4 illustrates an exemplary system for classifying images using a quantum convolutional neural network (QCNN) circuit, in accordance with aspects of this disclosure.

FIG. 4 illustrates an exemplary system 400 for classifying images using a quantum convolutional neural network (QCNN) circuit in accordance with aspects of this disclosure. System 400 may be executed by processor 310 in FIG. 3. More specifically, the algorithm associated with system 400 may be executed by algorithms component 210 according to an exemplary aspect.

In general, hybrid quantum algorithms use both classical and quantum data processing to perform a desired task. In the present disclosure, the images are classically processed and a classical compression technique is applied across the full dataset to extract a number of features, which can be sparsely loaded onto a quantum computer with a small number of qubits.

In accordance with the example embodiments described herein, quantum computing may include executing iterative processes by which one or more quantum circuits may be written in a classical computing environment for execution in a quantum computing environment. Non-limiting examples of such classical computing environment that can be used include a desktop computer, a laptop computer, a mobile device, a virtual-reality environment, etc. The quantum circuit may be submitted via a network, e.g., the Internet, to a quantum computing device at which the one or more quantum circuits may be queued with other quantum circuits, similar to, for example, batch processing for a mainframe computing device. The queued quantum circuits may be executed in turn.

The following is a high-level description of FIG. 4. It should be noted that QIP system 200 and computer device 300 may be the same device. Accordingly, the description of FIG. 4 is presented from the perspective of a device that includes the components of both QIP system 200 and computer device 300. Each step is further explained below. At 402, a dataset of images, a number of classes (e.g., 2), and class types are selected using user interface component 350. For example, the images may be of traffic signs, and there may be two class types of traffic signs that can be classified: stop signs and non-stop signs. In some aspects, the dataset of images may be stored in data store 340. At 404, algorithms component 210 may execute an autoencoder to compress the images and generate features of the images. At 406, algorithms component 210 implements sparse encoding on the features extracted by the autoencoder. At 408, the tensor objects that compose the quantum circuit are prepared (e.g., using Python and the TensorFlow (TF) and Tensor-Flow Quantum (TFQ) libraries).

At 410, system 400 enters the quantum phase and exits the classical phase. For example, the components of the classical phase may be executed by CPU 310*a* or GPU 310*b* of processor 310. The components of the quantum phase may be executed by QPU 310*c* of processor 310. In particular, a controller (e.g., general controller 205) translates the tensor objects into the native hardware gates. These gates manipulate qubits to perform quantum components (e.g., by applying sequences of electromagnetic pulses to ions trapped by trap 270, which allows for the creation of entangled states and performing quantum operations enabling image classification). The resulting quantum circuit is then ready to be executed on quantum hardware (e.g., QPU 310*c*). At 412, processor 310 executes the quantum circuit and a series of gates of the quantum circuit perform machine learning training and measurement. At 414, the parameters of the classification model associated with the quantum circuit are optimized in a parameter optimization loop where the parameters are updated after each epoch. This yields a trained classification model, which at 416, is executed to classify input images into the number of classes. In some aspects, a QC simulator is used in the system. The simulator serves as a potential option for running the quantum circuit using a classical simulator, instead of on the quantum computer backend. Accordingly, the algorithm may be ran using either the quantum computer or the simulator.

Autoencoder

A first portion of the QCNN hybrid classification algorithm involves classically processing the data to transform it to a format which can be processed on quantum computers such as QIP system 200. In some aspects, processor 310 applies pre-processing on the images including converting the dataset to grayscale images and equalizing the pixel intensities. Then, processor 310 applies a compression algorithm (e.g., principal component analysis (PCA), fully connected autoencoder, locality preserving variational autoencoder, etc.) on the pre-processed image dataset to extract the $N_q$ most important features of each image.

Figure 5:
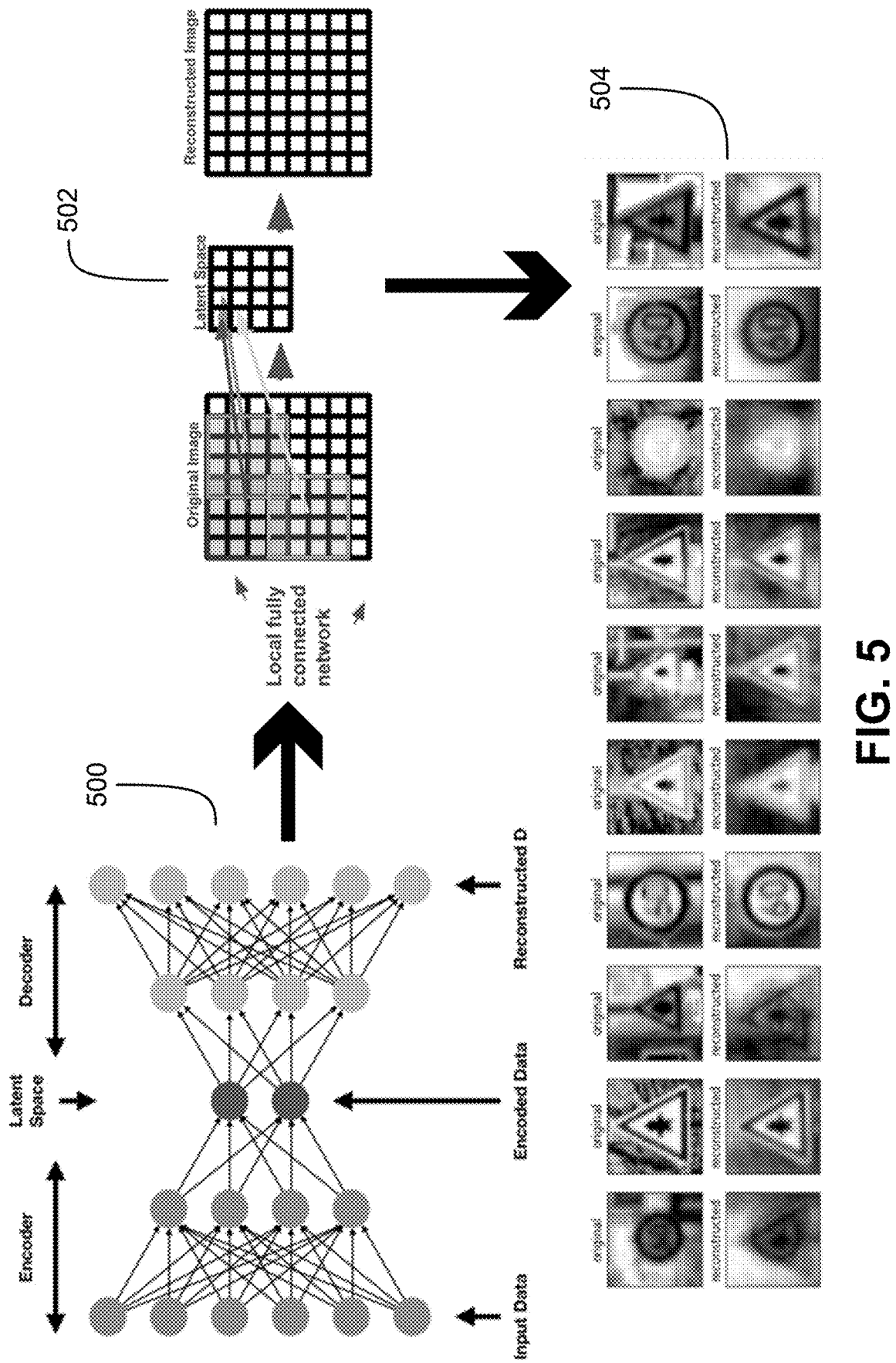
FIG. 5 depicts a general fully connected neural network autoencoder architecture, in accordance with aspects of this disclosure.

FIG. 5 depicts a general fully connected neural network autoencoder architecture 500. As shown, a compressed data set is created by using the latent space values. For example, in a locality preserving autoencoder compression scheme 502, local 2D filters are applied to map an original image to the compressed latent space pixels. The compressed data set is then created by using the latent space values. As a visual example, the original and reconstructed images 504 are shown for use in two category classification.

Certain compression algorithms have advantages over others. For example, one drawback of the PCA encoding scheme is that all features do not hold equal importance. The largest principal components include information of higher importance, and are mapped onto a few pixels. This configuration works well for models with a small number of qubits, but as the number of qubits on the hardware increases, this method will likely become increasingly difficult to train. Accordingly, processor 310 may determine an amount of qubits that will be included in the parameterized quantum circuit running the classification model. In response to determining that the amount of qubits is less than a threshold amount of qubits, processor 310 selects the PCA encoding scheme for step 404. If the amount of qubits is not less than threshold amount of qubits, processor 310 uses a fully connected autoencoder or a locality preserving variational autoencoder in step 404.

In a fully connected autoencoder, all local features in an original image are mapped to non-local features in the encoded latent space. It should be noted that as the dimension of a compressed image space increases, classification results are improved. However, a basic fully connected autoencoder has difficulty training if the latent space dimension is too small.

Accordingly, processor 310 may determine whether the latent space dimension associated with a compressed image space is less than a threshold size. If the latent space dimension is not less than the threshold size, the fully connected autoencoder is used in step 404. Otherwise, a locality preserving autoencoder compression scheme is used. In the locality preserving autoencoder, each pixel in the latent space includes compressed information about only a local region of the original image. The overall dimension of the latent space is determined by the size of the local fully connected filter. The smaller the latent space, the larger the necessary filter and the more information is compressed.

As the algorithm scales up to an increasing number of qubits, there will be a lower and lower degree of compression and the algorithm will smoothly scale to an image recognition algorithm on uncompressed images. For example, for 32×32 images, the local autoencoder may apply two layers of filters to compress the image to a 4×4 latent space. In the first layer, each filter has dimensions 4×4, and the stride length is 2. In the second layer, each filter has dimension 4×4 and the stride length is 3. If the size of the latent space were to double to 8×8 (such that a 64 qubit model is needed), processor 310 applies filters of size 2×2 in the second layer so that each latent space pixel represents a more localized region of the original image.

As the system scales to hundreds of qubits, each pixel in the latent space will include information about only a small region of the original image, so the algorithm will be very similar to image recognition on uncompressed images.

Sparse Encoding

Once the classical data is compressed to extract the $N_q$ most important features, in step 404, processor 310 encodes the classically extracted features into a quantum state by applying a quantum feature map, $U(x_i)$. This is a quantum circuit whose parameters depend on the pixel values of the $i^{th}$ input image $x_i$. For each image in a dataset, processor 310 creates a different quantum circuit that applies the unitary operation $U(x_i)$, which outputs quantum states corresponding to the features of the image.

When the classification model is trained, processor 310 appends the parameterized quantum circuit (PQC) to the end of this encoding circuit. In this way, any arbitrary classical image is transformable into quantum data, which can be processed by the PQC running the QCNN. For the QCNN model of the present disclosure, sparse encoding schemes are utilized. This means that the quantum encoding circuit includes one qubit per feature of the image. One advantage of this approach is that there exist efficient quantum circuits, which can apply these feature maps. For example, unary amplitude encoding and product state encoding may be used as quantum feature maps.

Figure 6A:
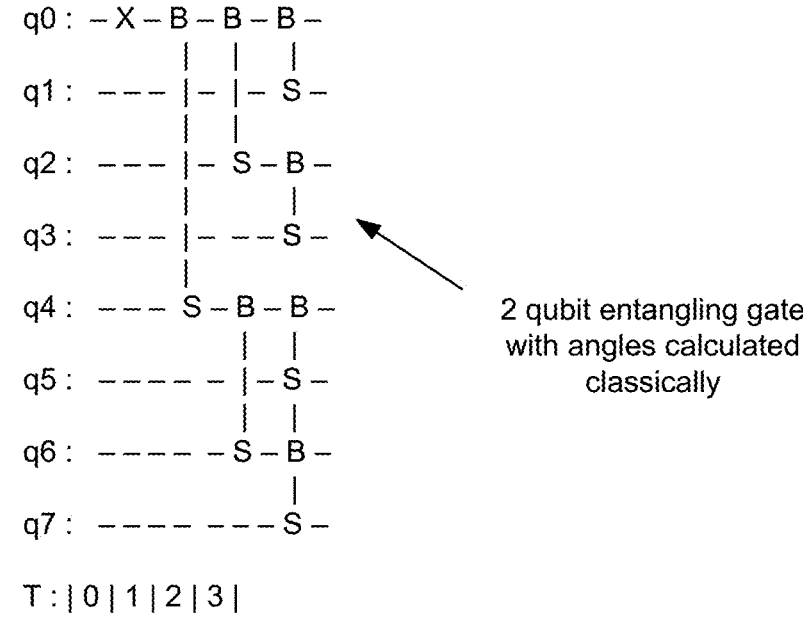
FIG. 6A depicts an example of unary amplitude encoding, in accordance with aspects of this disclosure.
Figure 6A:
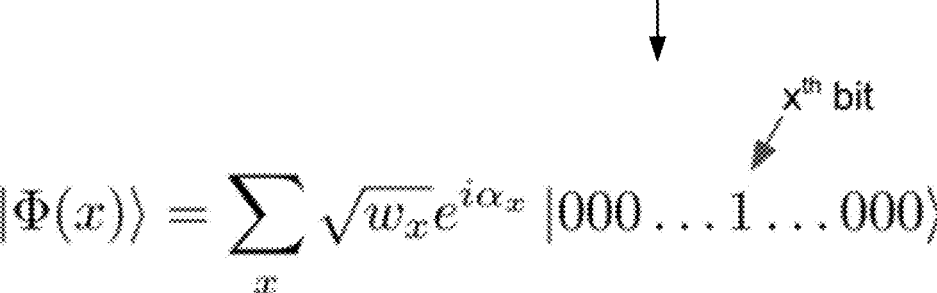

FIG. 6A depicts example 600 of unary amplitude encoding. When using unary amplitude encoding, the values of the $i^{th}$ pixel are encoded into the amplitudes of the N basis states $|i\rangle$. All other basis states have zero amplitude. The sparsely encoded amplitude state may be prepared efficiently using example 600 shown in FIG. 6A. Using this encoding scheme, any observable can be written as $|\psi\rangle = \Sigma_i^N \psi_i |i\rangle$, and expectation values can be written as $$\langle O \rangle = \langle \psi | U^\dagger O U | \psi \rangle = \sum_{ij} \langle \psi | B_{ij} | \psi \rangle = \sum_{ij} \psi_i \psi_j B_{ij}.$$

This is a sum over only $N^2$ terms. Therefore, the output of any parameterized quantum circuit which applies this sparse amplitude encoding feature map is at most quadratic in the sparsely encoded features of the original data.

FIG. 6A depicts one example for how to encode the classical data into a quantum state. The upper portion of the figure is the specific circuit that is used to encode a data point into the quantum state. The bottom portion of the figure shows the equation that describes the quantum system after the data loading circuit has been applied.

FIG. 6B depicts example 602 of product state encoding. When using product state encoding, the feature map applies a rotation about the y-axis by an angle $\theta = x_i/\|x\|$, to each qubit in the system, where $x_i$ is the pixel value of the compressed image and $\|x\|$ is the maximum value over all pixels. The resulting encoded state is a product state, but when written in terms of the wave function amplitude, is a nontrivial sum over all $2^N$ basis states.

$$|\psi\rangle = \prod_{i=0}^{N_q} R_y(\theta_i)|0\rangle = \sum_i^{2^n} c_i |i\rangle$$

Expectation values of this quantum state can be written as $$\langle O \rangle = \langle \psi | U^\dagger O U | \psi \rangle = \sum_{ij} \langle \psi | B_{ij} | \psi \rangle = \sum_{ij} c_i c_j B_{ij},$$

which is a sum over an exponential number of terms. Therefore because the product state encoding maps the data to a dense exponential feature space, the output of the PQC is more expressive than in the case of amplitude encoding. FIG. 6B further depicts a second option for how to encode the classical data into a quantum state. Again, the upper portion of the figure is an example circuit that is used to encode a data point into the quantum state, and the bottom equation describes the quantum state after the data loading circuit has been applied. In this equation, each vector shown in square brackets describes the state of one qubit of the quantum system, so that the full equation gives the state of all the qubits after the data has been loaded.

Parameterized Quantum Circuit

Quantum data processing occurs when the compressed data is loaded into a quantum state via a quantum feature map, and processed using a PQC. In the present disclosure, a QCNN is used within which one or more convolutional layers apply a quasi-local unitary operator to a finite number of qubits in a translationally invariant way for a finite depth. This means that the layers apply a set of operations to the data (e.g., executing a series of quantum gates which act on the qubits of the quantum computer). Each operation only acts on a few qubits at a time, and these qubits are specifically physically near each other. The same operation is repeated on all pairs of qubits that are closest to each other. One or more pooling layers are then applied which reduces the total number of qubits which are acted on in subsequent layers.

Figure 7:
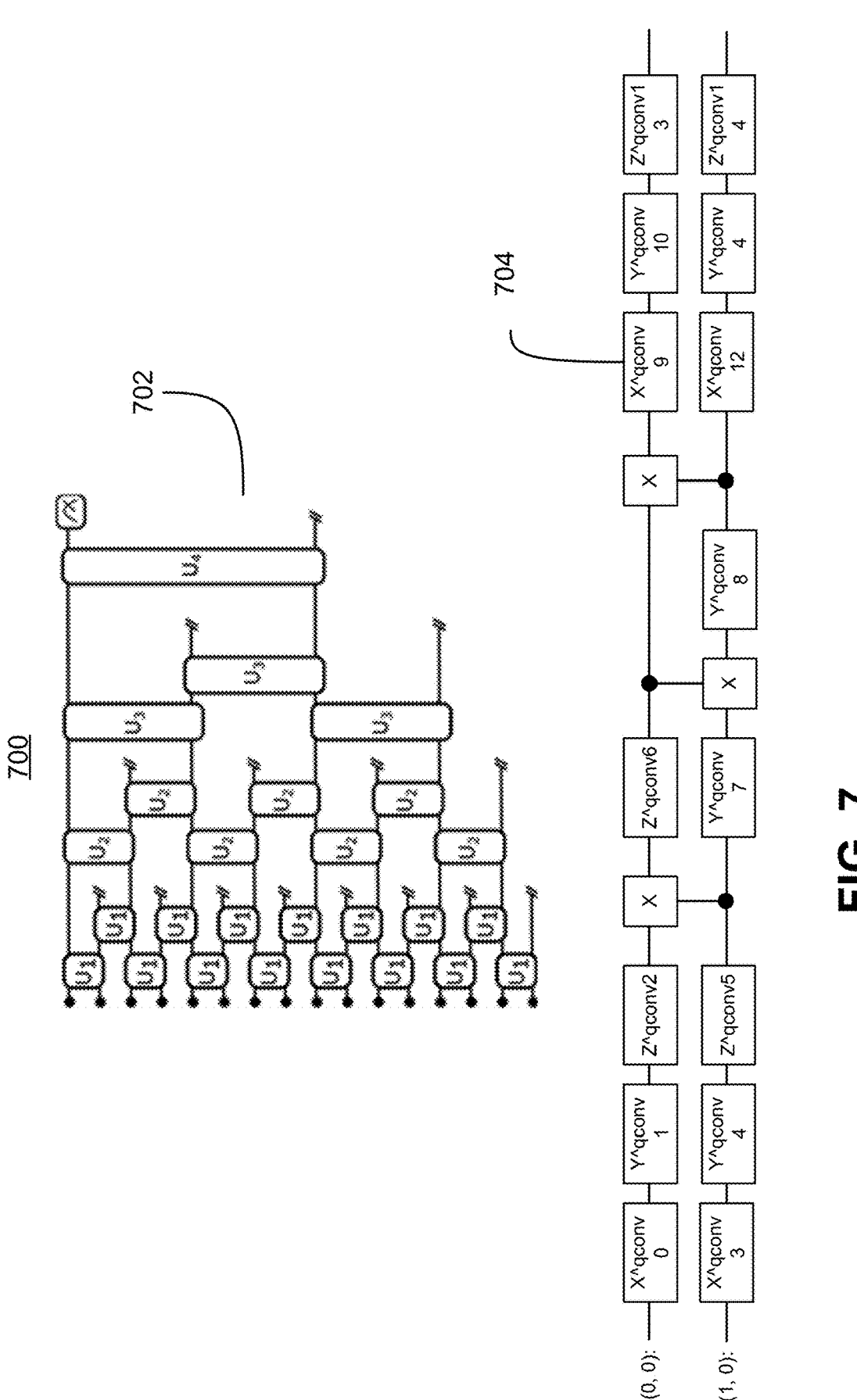
FIG. 7 is an example of an exemplary QCNN architecture, in accordance with aspects of this disclosure.

FIG. 7 is an example 700 of an exemplary QCNN architecture, which can be implemented using QIP system 200 as described above, for example. The QCNN 702 includes log(N) layers of unitary gates, each of which is followed by a "pooling layer." Each layer is composed of a set of identical two qubit unitary operators (e.g., $U_1$, $U_2$, $U_3$, $U_4$ as shown in example 700), which act on neighboring qubits within each layer and are applied in a brickwork structure. The unitary operators between different layers are separate unitary operators. The set of variational parameters is allowed to vary between separate layers.

Example 700 further depicts the one and two qubit gate decompositions 704 of each generic two qubit unitary operator. As shown in decompositions 704, each unitary operator applies an arbitrary SU (4) unitary operation, which can in general be written using 3 CNOT gates and 15 single qubit rotations as shown in FIG. 7. Therefore, in total, the QCNN model contains 15×log(N) variational parameters which need to be trained. The output for this model is a single $\langle Z \rangle$ measurement on the first qubit, which processor 310 uses to calculate a cost function (discussed below). Each of the gates that are shown in the upper portion of FIG. 7 apply a transformation that is implemented on the quantum computer using a series of quantum gates, which are shown in the bottom circuit. Each of the operations shown in the small rectangles in the bottom of the figure is a specific quantum gate that is applied. The X, Y and Z labels mean a rotation around the X, Y or Z axis. For example, "X^qconv0" means that a rotation is performed around the X axis by an angle that is specified by the qconv0. The qconv0, qconv1, etc., are variables that change depending on the transformation to be applied.

Figure 8:
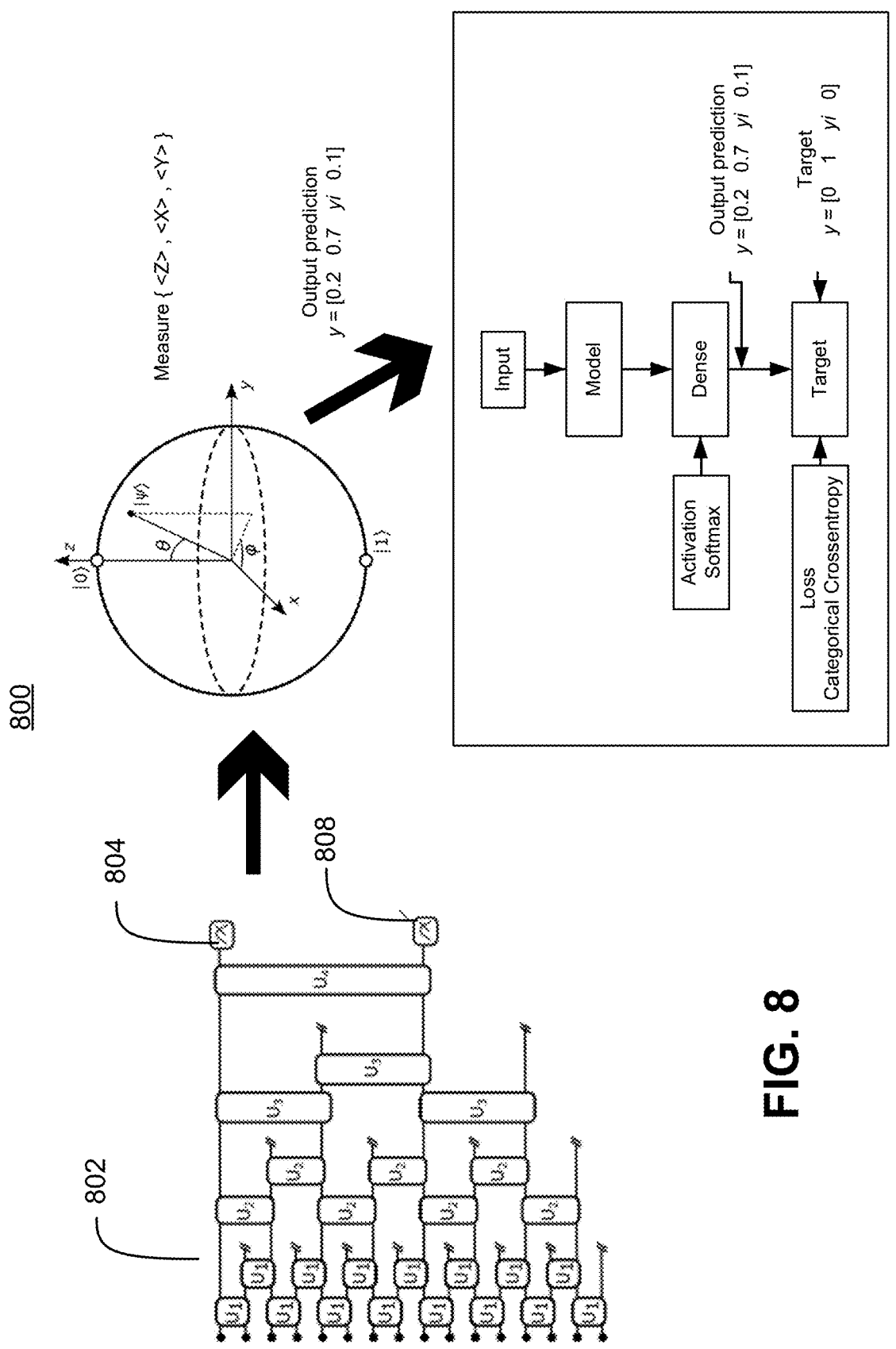
FIG. 8 is an example of using the QCNN architecture for multi-category classification, in accordance with aspects of this disclosure.

FIG. 8 is an example 800 of using the QCNN architecture for multi-category classification. In some aspects, in order to perform multi-category classification, the QCNN model 802 may be extended to include multiple measurements 804 and 806 on the output qubits and further post-processing of the measurement data. As shown in FIG. 8, the QCNN architecture described above may be first applied. Since the classification algorithm must now separate the possible output quantum states into additional distinct regions, measurements in multiple bases and on multiple qubits at the end of the parameterized quantum circuit are included. Processor 310 feeds these measurements into a classical fully connected neural network which uses a softmax activation function and outputs a C dimensional prediction vector. Processor 310 compares the prediction to the one-hot encoded training labels to calculate the categorical cross-entropy cost function. In FIG. 8, the flowchart describes what happens to the classical data after it is measured from the output of the quantum circuit. In particular, the figure depicts the classical machine learning model that is applied to the data. It shows that the output data from the quantum circuit is processed by a classical neural network, which converts the measurements from the quantum circuit into a prediction for the classification algorithm. The data is fed into the model, which includes a classical neural network made up of a dense neural network layer with a softmax activation function. This outputs a prediction which is compared by the model to the target labels for each data point. This model then outputs the value of the loss function from this comparison.

Parameter Optimization

The classical neural network takes the output of the quantum circuit and applies another transformation to the data. It is trained together with the QCNN portion of the model to classify the data. It differs from the QCNN in that it processes the data in a fully classical way, whereas the QCNN applies quantum processing of the data. In the full model, both the quantum and classical parts are trained together to accomplish the same task. In the full model, the QCNN acts on the original input data, whereas the classical NN acts on the processed data, which is output from the quantum circuit.

In particular, the QCNN circuit includes $\log_2(N_q)$ layers, and applies identical copies of a two qubit unitary matrix. In one customization, each unitary matrix may be parameterized by 15 free variational parameters. Therefore, the 4 qubit QCNN circuit contains 30 parameters, the 8 qubit circuit contains 45 free parameters and the 16 qubit circuit contains 60 free parameters. At the end of the circuit, in the most general case a fully connected neural network is applied. This neural network has 4 input nodes, for the four measurement outcomes ($\langle Z \langle$ and $\rangle X \rangle$ on the two output qubits), and C output nodes, where C is the number of categories to be classified. This gives another 5 variational parameters for each category to be classified. Finally, there are a large number of variational parameters present in the local variational autoencoder. This autoencoder contains 156-760 trainable parameters.

The output of the QCNN are measurements in one or more bases of the output qubits of the PQC. Processor 310 classically processes these measurements to give a final prediction for the overall hybrid classification task. By comparing this prediction to the labels in the training data set, a cost function for the QCNN model is calculated. The variational parameters of the QCNN model are then adjusted to minimize this cost function.

For binary classification, there are several possible choices of cost function. In the simplest case, the $\langle Z \rangle$ expectation value is measured on a single qubit of the PQC. In this case, the training labels can be transformed, so that the two categories correspond to labels $y_i=\pm 1$. Then, in a perfectly trained model, measurements of $\langle Z \rangle > 0$ correspond to $y_i = +1$, and $\langle Z \rangle < 0$ correspond to the category $y_i = -1$. To evaluate this model, loss functions such as the "Mean-Squared Error" (MSE) or "Binary Cross Entropy" (BCE) may be executed. The MSE cost function is defined by the equation $MSE = \Sigma_{i=1}^{M}(p_i - y_i)^2$, where $p_i$ is the output of the model, and corresponds to $\langle Z \rangle$ in the example above, and the sum from 1 to M is over some set of M images from the dataset.

The BCE loss is defined by the equation $BCE = \Sigma_{i=1}^{M} - y_i \log(p_i) - (1 - y_i)\log(1 - p_i)$. The advantage of the BCE cost function is that the model is strongly punished for confident predictions which are incorrect, which in the classical machine learning literature lead to training models that give more robust predictions.

In some aspects, for multicategory classification, the categorical cross-entropy loss function may be executed. This is defined as $CCE(\theta) = _i {}^C t_i \log(f(\tilde{p})_i)$, where C is the number of categories, $t_i$ is the training label, $\tilde{p}_i$ is the C dimensional vector output by the model, and $f(p)_i$ is the softmax activation function $f(p)_i = e^{-p_i}/(\Sigma_j e^{-p_j})$.

Figure 9:
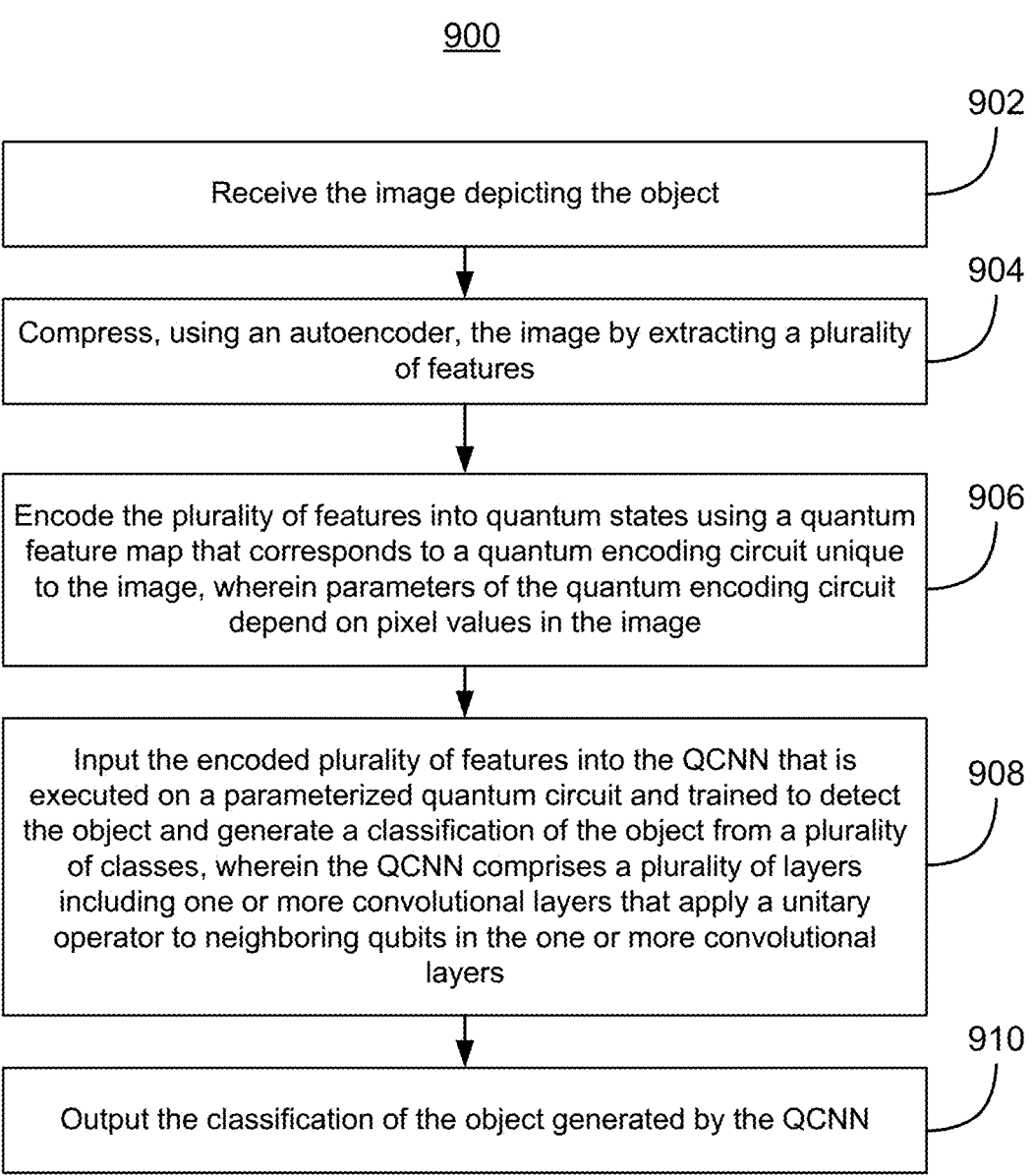
FIG. 9 is a flowchart of a method for classifying images using a QCNN circuit, in accordance with aspects of this disclosure.

FIG. 9 is a flowchart of method 900 for classifying images using a QCNN circuit, in accordance with aspects of this disclosure. At 902, processor 310 receives an image depicting an object. For example, the image may be of a driving intersection and specifically focused on a traffic sign. The traffic sign may need to be classified as a "stop sign" or "non-stop sign." In some aspects, processor 310 may perform pre-processing on the image. For example, processor 310 may convert the image to a grayscale image and/or equalize pixel intensities in the converted image.

At 904, processor 310 compresses, using an autoencoder, the image by extracting a plurality of features. In some aspects, the autoencoder is one of: an autoencoder executing principal component analysis, a fully connected autoencoder, or a locality preserving variational autoencoder. More specifically, the autoencoder is the autoencoder executing principal component analysis when an amount of qubits in the PQC executing the QCNN is less than a threshold amount of qubits. The autoencoder is the fully connected autoencoder or the locality preserving variational autoencoder when the amount of qubits in the PQC is not less than the threshold amount of qubits. Accordingly, each pixel in a latent space includes compressed information only about a local region of the image, and wherein an overall dimension of the latent space is determined by a size of a local fully connected filter. The autoencoder is the locality preserving variational autoencoder when a latent space dimension is less than a threshold size. The autoencoder is the fully connected autoencoder when the latent space dimension is not less than the threshold size.

At 906, processor 310 encodes the plurality of features into quantum states using a quantum feature map that corresponds to a quantum encoding circuit unique to the image. Here, the parameters of the quantum encoding circuit depend on pixel values in the image. In some aspects, encoding the plurality of features comprises applying one of: product state encoding or unary encoding. In some aspects, the quantum encoding circuit includes one qubit per feature of the plurality of features. In some aspects, the quantum encoding circuit is composed of tensor objects, and wherein a controller translates the tensor objects into native hardware gates.

At 908, processor 310 inputs the encoded plurality of features into the QCNN that is executed on a parameterized quantum circuit (PQC) and trained to detect the object and generate a classification of the object from a plurality of classes. For example, the QCNN may be configured to determine whether an image includes a stop sign or a non-stop sign.

In an exemplary aspect, the QCNN comprises a plurality of layers including one or more convolutional layers that apply a unitary operator to neighboring qubits in the one or more convolutional layers. In some aspects, the unitary operator is a quasi-local unitary operator applied in a translationally invariant way for a finite depth. In some aspects, the unitary operator is a two qubit unitary operator that applies an arbitrary unitary operation using CNOT gates and single qubit rotations.

In some aspects, training the QCNN comprises optimizing variational parameters of the QCNN using a cost function comprising one of: mean-squared error or binary cross entropy.

At 910, processor 310 outputs the classification of the object generated by the QCNN. In some aspects, outputting the classification of the object generated by the QCNN comprises receiving one or more measurements from the QCNN, and inputting the one or more measurements into a fully connected neural network that is configured to output the classification from a plurality of classes.

In general, it is noted that the previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for classifying an object in an image using a quantum convolutional neural network (QCNN), comprising:

receiving the image depicting the object;

compressing, using an autoencoder, the image by extracting a plurality of features;

encoding the plurality of features into quantum states using a quantum feature map that corresponds to a quantum encoding circuit unique to the image, wherein parameters of the quantum encoding circuit depend on pixel values in the image;

inputting the encoded plurality of features into the QCNN that is executed on a parameterized quantum circuit (PQC) and trained to detect the object and generate a classification of the object from a plurality of classes, wherein the QCNN comprises a plurality of layers including one or more convolutional layers that apply a unitary operator to neighboring qubits in the one or more convolutional layers; and outputting the classification of the object generated by the QCNN.

2. The method of claim 1, wherein outputting the classification of the object generated by the QCNN comprises:

receiving one or more measurements from the QCNN; and inputting the one or more measurements into a fully connected neural network that is configured to output the classification from a plurality of classes.

3. The method of claim 1, wherein the quantum encoding circuit includes one qubit per feature of the plurality of features.

4. The method of claim 1, wherein the unitary operator is a quasi-local unitary operator applied in a translationally invariant way for a finite depth.

5. The method of claim 1, wherein the unitary operator is a two qubit unitary operator that applies an arbitrary unitary operation using CNOT gates and single qubit rotations.

6. The method of claim 1, wherein the quantum encoding circuit is composed of tensor objects, and wherein a controller translates the tensor objects into native hardware gates.

7. The method of claim 1, wherein encoding the plurality of features comprises applying one of: product state encoding or unary encoding.

8. The method of claim 1, wherein the autoencoder is one of: an autoencoder executing principal component analysis, a fully connected autoencoder, or a locality preserving variational autoencoder.

9. The method of claim 8, wherein the autoencoder is the autoencoder executing principal component analysis when an amount of qubits in the PQC is less than a threshold amount of qubits.

10. The method of claim 9, wherein the autoencoder is the fully connected autoencoder or the locality preserving variational autoencoder when the amount of qubits in the PQC is not less than the threshold amount of qubits.

11. The method of claim 8, wherein the autoencoder is the locality preserving variational autoencoder when a latent space dimension is less than a threshold size.

12. The method of claim 11, wherein the autoencoder is the fully connected autoencoder when the latent space dimension is not less than the threshold size.

13. The method of claim 8, wherein the autoencoder is the locality preserving variational autoencoder, wherein each pixel in a latent space includes compressed information only about a local region of the image, and wherein an overall dimension of the latent space is determined by a size of a local fully connected filter.

14. The method of claim 1, wherein training the QCNN comprises optimizing variational parameters of the QCNN using a cost function comprising one of: mean-squared error or binary cross entropy.

15. The method of claim 1, further comprising prior to compressing the image:

converting the image to a grayscale image; and equalizing pixel intensities in the converted image.

16. A quantum information processing (QIP) system for classifying an object in an image using a quantum convolutional neural network (QCNN), comprising:

at least one memory; and at least one hardware processor coupled with the at least one memory and configured, individually or in combination, to:

receive the image depicting the object;

compress, using an autoencoder, the image by extracting a plurality of features;

encode the plurality of features into quantum states using a quantum feature map that corresponds to a quantum encoding circuit unique to the image, wherein parameters of the quantum encoding circuit depend on pixel values in the image;

input the encoded plurality of features into the QCNN that is executed on a parameterized quantum circuit (PQC) and trained to detect the object and generate a classification of the object from a plurality of classes, wherein the QCNN comprises a plurality of layers including one or more convolutional layers that apply a unitary operator to neighboring qubits in the one or more convolutional layers; and output the classification of the object generated by the QCNN.

* * * * *